Oct. 25, 1960 A. V. MORTORELLI 2,957,217
HOSE CLAMP
Filed Oct. 24, 1958
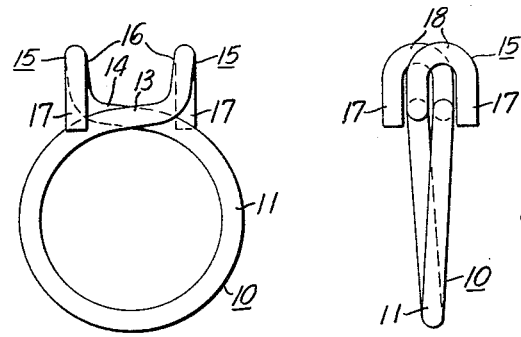
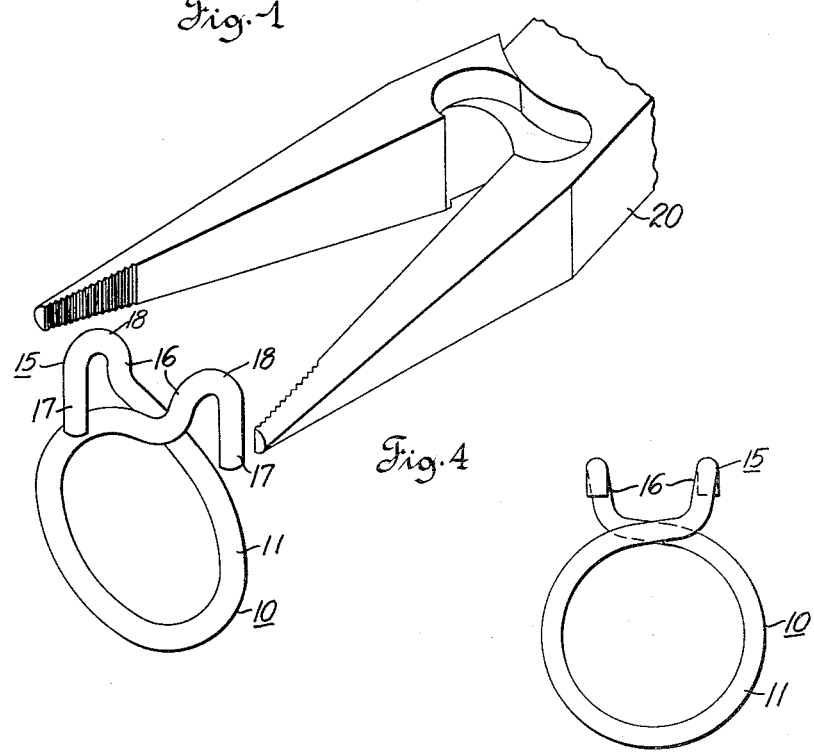
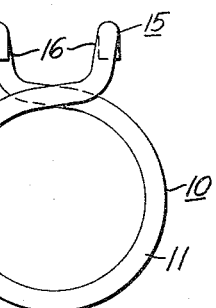
Inventor
Alfred V. Mortorelli
By Robert B. Benson
Attorney United States Patent Office 2,957,217
Patented Oct. 25, 1960

2,957,217

HOSE CLAMP

Alfred V. Mortorelli, West Allis, Wis., assignor to Ads Corporation, Milwaukee, Wis.

Filed Oct. 24, 1958, Ser. No. 769,464

1 Claim. (Cl. 24—27)

This invention relates generally to hose clamps. More specifically this invention relates to self-tightening or self-contracting hose clamps.

Self-tightening or self-contracting hose clamps are generally made of a length of spring wire which is formed as a circle having a diameter slightly less than the diameter of the hose or other object to be clamped. The ends of the wire usually overlap and form means for temporarily expanding the size of the clamp. In applying the clamp to a hose or the like, the ends of the wire are forced together to expand the clamp. The clamp is then placed around the object to be clamped and released. The inherent spring force of the clamp causes the clamp to contract around the object and grip the object with a substantially uniformly distributed force to securely grip the object.

Most prior art self-tightening clamps are difficult to assemble because they provide inadequate tool gripping surfaces and often require special tools for assembly. Furthermore, these clamps are somewhat dangerous to use without the special mounting tools because when mounting the clamp without the proper tools the clamp often slips resulting in possible injury to the person assembling or removing the clamp. Furthermore, when trying to expand the clamp for mounting on a hose or removal therefrom even with the use of special mounting tools the clamp had a tendency to twist out of the hands of the operator due to the tremendous force built up by the natural spring tension of the clamp. The twisting sometimes is sufficient to cause the tool to slip out of the hands of the operator resulting in possible injury to the operator. Furthermore, the twisting caused a separation of overlapping portions of the clamp resulting in a very poor clamping and/or sealing action from the clamp.

The clamp of this invention overcomes the problems of similar prior art clamps by utilizing hooked or U-shaped hasp ends on the clamp. The hasp end portions extend outwardly from the circular portion of the clamp a sufficient distance to form good gripping surfaces for the application of an ordinary tool such as a pair of pliers for expanding the clamp prior to mounting and removing the clamp from a hose or the like. Furthermore, the end of the clamp may extend over and to the other side of an adjacent portion of the clamp to prevent the separation or skewing movement of the overlapping portions of the clamp.

Therefore, it is the object of this invention to provide a new and improved self-tightening hose clamp.

Another object of this invention is to provide a new and improved self-tightening hose clamp that is easier to mount and dismount.

Another object of this invention is to provide a new and improved self-tightening hose clamp that provides a better grip and seal.

Another object of this invention is to provide a new and improved self-tightening hose clamp that is safer to use.

Other objects and advantages of this invention will be apparent from the following description when read in connection with the following drawings, in which:

Fig. 1 is a front view of the hose clamp of this invention;

Fig. 2 is a side view of the clamp shown in Fig. 1;

Fig. 3 is a side view of a modified hose clamp of this invention; and

Fig. 4 is a pictorial view of the hose clamp shown in Fig. 1 and a tool positioned to engage the clamp for expanding it prior to placing the clamp on a hose or the like.

As shown in the drawings, the self-tightening hose clamp 10 of this invention is made up of a wire or band 11 that forms a circle having overlapping portions 13, 14. The band 11 is a prestressed wire of spring steel or other suitable material. Preferably, the wire is substantially circular in cross section but other forms could be used with varying degrees of success.

The band 11 has overlapping portions 13, 14 that lie adjacent to each other to simulate a circle lying in a single plane. Furthermore, when a clamp having such a configuration is mounted on a hose it provides an excellent seal that tends to prevent any leakage between the hose and the element to which the hose is being attached.

The ends of the band 11 terminate in substantially hooked or U-shaped hasp members 15 that extend outwardly from the circular portion of the clamp, make substantially a 180 degree turn and extend inwardly toward the other side of the adjacent overlapping portion of the band 11. The two legs 16, 17 and the cross bar 18 of the hooked or U-shaped member 15 combine to form or define an area or surface that can easily be gripped by a tool such as the pair of pliers 20 partially shown in Fig. 4, so that the clamp may be expanded radially. With such a surface or area the tool is not likely to slide off because it engages the clamp in a number of places and over a substantial surface of the tool. Preferably the hooked or U-shaped hasp members 15 lie in substantially parallel planes to further facilitate the gripping of the clamp.

In the preferred embodiment as shown in Fig. 1, the second leg 17 of the member 15 extends to the opposite side of the overlapping portions 13 or 14 from where it began. In this position, the second leg of the hooked or U-shaped hasp member performs the function of holding the overlapping sections 13, 14 together. This function is especially valuable when applying the clamp to a hose or the like that requires a good seal as well as a clamp. Further, the bight of each hasp member is made of sufficient depth and width to accommodate the adjacent end portion of the wire freely and without binding, to give freedom of movement to said end portions in the hasp members when the clamp is stressed. By preventing separation by skewing or twisting of the overlapping portions of the clamp during mounting, it also prevents the accidents that are incidental to such twisting, skewing and separation such as was explained above. Furthermore, in preventing the separation of the overlapping portions, it assures a better clamp and seal.

Of course it is not critical that the hook shaped members 15 be exactly U-shaped. It is only necessary that they extend outwardly a suitable distance from the band and curve around to define a surface that provides more than one point of contact with the mounting tool. The outward direction of the members 15 is also not critical and will vary with the size of the hose clamps. The preferred outward direction of the members 15 as shown in Fig. 1 is such that surfaces formed by the members lie in planes that are substantially parallel. Furthermore, the members 15 must be separated by enough space to allow sufficient expansion of the clamp to allow mounting of the clamp on the hose.

Although the invention has been illustrated and described in connection with a particular hose clamp, it will be obvious to those skilled in the art that various modifications and changes may be made in the illustrated structure without departing from the spirit of the invention or the scope of the appended claim.

The invention claimed is:

A self tightening clamp for hoses and the like comprising a single loop of prestressed metal wire material of substantially circular cross sectional shape formed to define substantially a circle having a diameter less than the diameter of the object to be clamped, the opposite end portions of said loop extending adjacent each other a substantial distance in substantially side by side relationship, each end portion being formed integrally with a radially outwardly extending, generally U-shaped hasp member, defining a pair of spaced lugs adapted to be received between the jaws of a pair of pliers or the like, whereby to exert squeezing force on said lugs and cause said loop to expand radially, each hasp member having a free outer arm which extends substantially radially inwardly a sufficient distance so that each hasp member defines a bight receiving substantially the cross section of the adjacent end portion of the body of the said loop and said hasp member is engageable with said adjacent end portion to resist skewing movement of the adjacent end portions of the said loop when said lugs are squeezed towards each other, the cross section of the entire length of wire and hasp member being substantially uniform, the bight of each hasp member being of substantially greater depth and width than the diameter of the wire material of the loop received therein, to provide a space between the bight of the hasp and the loop to accommodate the adjacent end portion of the loop freely and without binding, to give freedom of movement of said loop end portions in said hasps when the clamp is stressed.

References Cited in the file of this patent

UNITED STATES PATENTS

| 2,006,358 | Kurkjian | July 2, 1935 |
| 2,180,271 | Arras | Nov. 14, 1939 |
| 2,849,770 | Klancnik | Sept. 2, 1958 |

FOREIGN PATENTS

| 10,042 | Great Britain | Apr. 29, 1913 |
| 86,062 | Switzerland | Aug. 2, 1920 |
| 482,779 | Great Britain | Apr. 5, 1938 |